United States Patent [19]

Kataoka et al.

[11] Patent Number: 5,270,752
[45] Date of Patent: Dec. 14, 1993

[54] METHOD AND APPARATUS FOR A FOG SCREEN AND IMAGE-FORMING METHOD USING THE SAME

[75] Inventors: Akira Kataoka, Osaka; Yasuhiro Kasahara, Tokyo, both of Japan

[73] Assignees: Ushio U-Tech Inc.; Dentsu Prox Inc., both of Tokyo, Japan

[21] Appl. No.: 985,755

[22] Filed: Dec. 4, 1992

Related U.S. Application Data

[63] Continuation of Ser. No. 827,048, Jan. 29, 1992, abandoned.

[30] Foreign Application Priority Data

Mar. 15, 1991 [JP] Japan ................... 3-077044

[51] Int. Cl.$^5$ ................... B05B 1/28; G03B 21/60
[52] U.S. Cl. ................... 353/28; 353/122; 359/443; 239/18; 239/20
[58] Field of Search ................... 353/28, 62, 80, 79, 353/122; 359/443, 446, 450, 460; 239/18, 20, DIG. 23

[56] References Cited

U.S. PATENT DOCUMENTS

| | | | |
|---|---|---|---|
| 3,334,816 | 8/1967 | Mizuno | 359/446 |
| 4,974,779 | 12/1990 | Araki et al. | 239/18 |
| 5,067,653 | 11/1991 | Araki et al. | 239/18 |

FOREIGN PATENT DOCUMENTS

| | | | |
|---|---|---|---|
| 0337480 | 10/1989 | European Pat. Off. | |
| 476372 | 6/1929 | Fed. Rep. of Germany | |
| 429860 | 4/1911 | France | |
| 0165132 | 12/1981 | Japan | 359/446 |
| 0165133 | 12/1981 | Japan | 359/446 |
| 0192237 | 10/1984 | Japan | 359/443 |
| 2-44731 | 3/1990 | Japan | |
| 0647605 | 1/1985 | Switzerland | 359/446 |
| 2220278 | 1/1990 | United Kingdom | 359/446 |

OTHER PUBLICATIONS

Patent Abstract of Japan, Publication No. JP2201488, Araki et al., published Oct. 26, 1990, vol. 014494.
Patent Abstract of Japan, Publication No. JP2204775, Araki et al., published Oct. 26, 1990, vol. 014498.

*Primary Examiner*—William A. Cuchlinski, Jr.
*Assistant Examiner*—William C. Dowling
*Attorney, Agent, or Firm*—Finnegan, Henderson, Farabow, Garrett & Dunner

[57] ABSTRACT

A method and apparatus for forming a fog screen for use in the projection for display of an optical image which comprises disposing a pair of substantially parallel air curtains and blowing a fog into the space defined by and between the air curtains. The fog screen is high and uniform in density and can be utilized for forming a well-defined image thereon that is free from distortions or interruptions.

4 Claims, 2 Drawing Sheets

METHOD AND APPARATUS FOR A FOG SCREEN AND IMAGE-FORMING METHOD USING THE SAME

This application is a continuation of application Ser. No. 07/827,048, filed Jan. 29, 1992, now abandoned.

BACKGROUND OF THE INVENTION

The present invention relates to a method and apparatus for forming a fog screen and an image-forming method using the same. More particularly, the invention relates to a method and apparatus for forming a fog screen for use in the projection for display of an optical image from a projector and an image-forming method using the same.

BRIEF DESCRIPTION OF THE PRIOR ART

There is known a technique of forming a two-dimensional water-film screen by driping or ejecting jets of) water from a plurality of nozzles and projecting an optical image from a projector on the resulting screen in lieu of an ordinary cinematographic or other screen in the form of a sheet or a board. Such a water-film screen is suitable for outdoor large-scale displays but in a confined indoor space the formation of such a screen is accompanied with high water noise so that no satisfactory sound effect can be superimposed. Furthermore, as the spectators or audience cannot walk through the screen, the real cinematographic effect with "presence" may not be obtained.

In view of these problems, it has been proposed to form a fog screen by blowing a fog (dry ice or the like) from a linear series of nozzles and use it as the screen for receiving an optical image from a projector (Japanese Kokai Utility Model Publication No. 2-44731). Such a fog screen does not involve any appreciable noise and the spectators or audience may freely walk through it, thus insuring a dramatic cinematographic effect.

However, this prior art fog screen has the disadvantage in that the fog exhaled from the nozzles diffuses, into the ambient air owing to atmospheric resistance as it travels far and away from the nozzles and the consequent increase in thickness of the fog results in a decrease in its density. Therefore, the projected image becomes increasingly blurred with an increasing distance from the nozzles, although it is sharp and in focus in the neighborhood of the nozzles, thus failing to provide a homogeneous and sharp image reproduction. Moreover, the fog is unstable in the air and vulnerable to air currents so that the image tends to be distorted or interrupted. This tendency is particularly pronounced when such a screen is formed outdoors. Thus, cinematography using such a prior art screen has so far found application only in cases where the goal is not a faithful reproduction of images but enlivened scenes with dramatic or surprise effects are to be emphasized.

SUMMARY OF THE INVENTION

To overcome the above drawbacks of the prior art, the present invention provides a method of forming a fog screen capable of providing a uniform and sharp image and an image-forming method using the same.

It is, therefore, an object of the invention to provide a method of forming a fog screen which comprises providing a pair of substantially parallel air curtains with a suitable spacing and blowing a fog in the space defined by and between said air curtains. Particularly, in order to prevent build-up of ambient humidity and control the flows of the air curtains and fog, there is preferably disposed an aspirator in a position confronting an expirator which has a fog outlet and air outlets. The preferred spacing between the two air curtains is about 30 to 100 mm and the preferred mean particle diameter of the fog is about 10 to 30 microns or less.

It is another object of the invention to provide an image-forming method which comprises projecting an optical image from a cineprojector or the like on said fog screen.

It is yet another object of this invention to provide an apparatus for forming a fog screen for display thereon of an optical image projected from a projector comprising a pair of spaced longitudinally extending air nozzles for forming a pair of spaced, parallel and longitudinal curtains of air and fog expirator means for creating and blowing a longitudinally extending stream of fog into the space between said air curtains to form a fog screen therein.

In the method and apparatus for forming a fog screen according to this invention, the fog exhaled into the space defined by said two substantially parallel air curtains can diffuse only within this space. Therefore, the diffusion of the fog is limited even in positions remote from the expirator so that increases in the thickness and decreases in the density of the fog can be effectively precluded.

In the image-forming method of the invention, wherein the optical image from a projector is projected on the above fog screen, there is obtained a sharp reproduction which is free from distortion or interruption.

DETAILED DESCRIPTION OF THE INVENTION

The present invention will now be described in detail with reference to the accompanying drawings illustrating a preferred embodiment.

Figure 1:
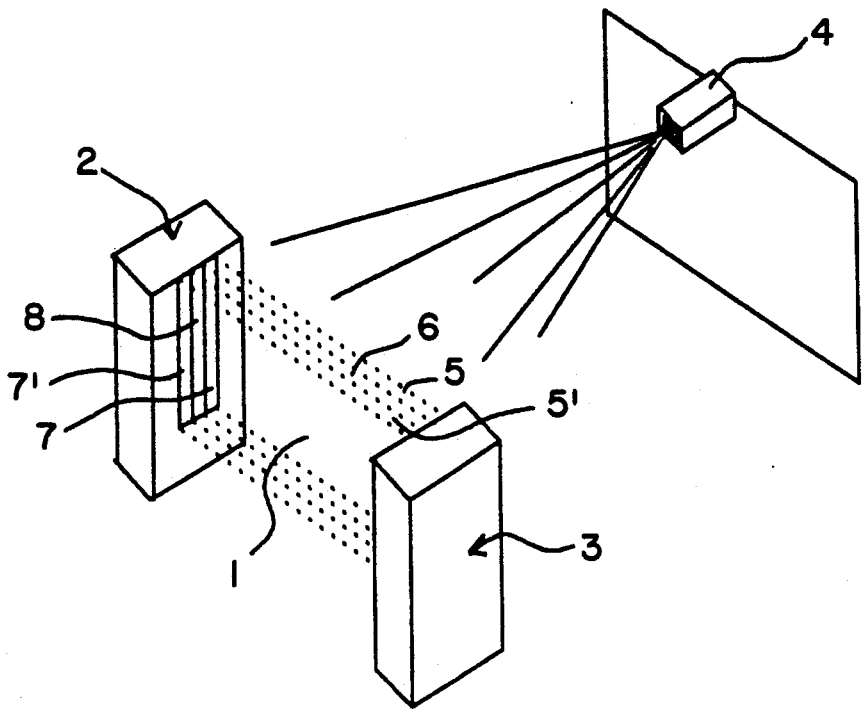
FIG. 1 is a schematic diagram illustrating an image reproducing system employing the method of producing a fog screen in accordance with the invention.

FIG. 1 is a schematic diagram showing the reproduction of an image using the fog screen formed by the method of the invention. As illustrated, a fog screen 1 is formed between a expirator device 2 and an aspirator device 3 so that an optical image may be projected from a cinematographic or other projector 4 on the fog screen 1. The fog screen 1 consists of two air curtains 5,5' exhaled from air outlet nozzles 7,7' of the expirator device 2 and traveling substantially in parallel relation toward the aspirator device 3 and a fog 6 exhaled from a fog outlet 8 of the expirator 2 into the space defined by and between said air curtains 5,5'.

The various components of the system illustrated in FIG. 1 are now described in detail.

Figure 2:
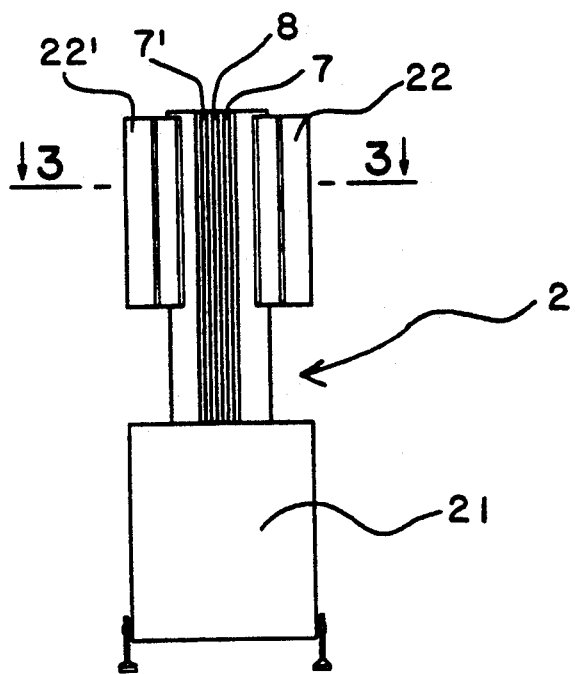
FIG. 2 is a front view showing an example of the expirator employed in said system.
Figure 3:
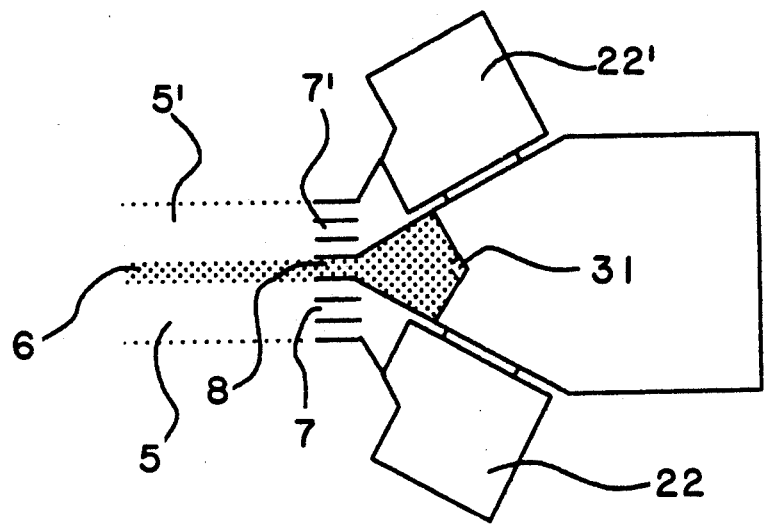
FIG. 3 is a schematic sectional view taken along the line 3—3 of FIG. 2, showing the operation of the expirator.

FIG. 2 is a front view showing an example of the expirator 2 and FIG. 3 is a schematic sectional view (on a scale different from that of FIG. 2) which illustrates the operation of the expirator 2. The expirator 2 comprises a base 21 having a built-in water tank in the base, a fog outlet 8 for blowing a fog 6, and air outlets 7,7' for developing air curtains 5,5' disposed on both sides of said fog outlet 8 along the axial direction of the expirator 2. The axial length of the fog outlet 8 and air outlets 7,7' can be set to an optional value according to the desired height of the fog screen 1, and the height of the base 21 can also be chosen as desired according to the desired height of the fog screen 1. Disposed in a single axially aligned row within the fog outlet 8 are a plurality of nozzle means 31 (one of which is shown) for exhaling the fog 6. These nozzles 31 may be conventional nozzles but in order to insure an increased sharpness of the reproduced image, are preferably such that the fog 6 generated will be formed of water droplets or particles with a mean diameter of about 10 to 30 microns. Furthermore, where the fog screen 1 is to be installed in such a manner that the audience may freely walk through the screen, a fog with a mean particle diameter of less than 10 microns (the so-called dry fog) is preferably used as the fog 6. Since the dry fog is characterized in that it does not wet the surface of an object coming into contact therewith, the audience walking through the screen 1 is not wetted by the fog. The means for generating the dry fog can be ordinary commercial dry fog nozzles. Such dry fog nozzles utilize compressed air which is ejected at a high speed to atomize water into finely divided particles and such a typical nozzle is commercially available under the trademark of AKI JET (Ikeuchi K. K., Japan).

The air curtains 5,5' can be formed in the per se conventional manner. Thus, the air curtains 5,5' produced as air are blown from said air outlets 7,7' on both sides of the fog outlet 8 of said expirator 2. The air to be expired is supplied under pressure by means of fans 22,22' of the expirator 2. The spacing between the air outlets 7 and 7', that is to say the interval between the two air curtains 5,5', is set generally to about 5 to 200 mm, preferably to about 10 to 150 mm, and for still better results, to about 30 to 100 mm. If the interval is less than 5 mm, it will be technically difficult to produce the fog screen 1. Conversely, if the interval exceeds 200 mm, the diffusion of the fog 6 in the vertical direction of the fog screen 1 may become too great to maintain the uniform density of fog 6 in the screen 1. To prevent this diffusion, it is recommended to provide further air outlets above and/or below the air outlets 7,7' to form air curtains and exhale a further amount of fog 6 into the space defined by the air curtains.

Figure 4:
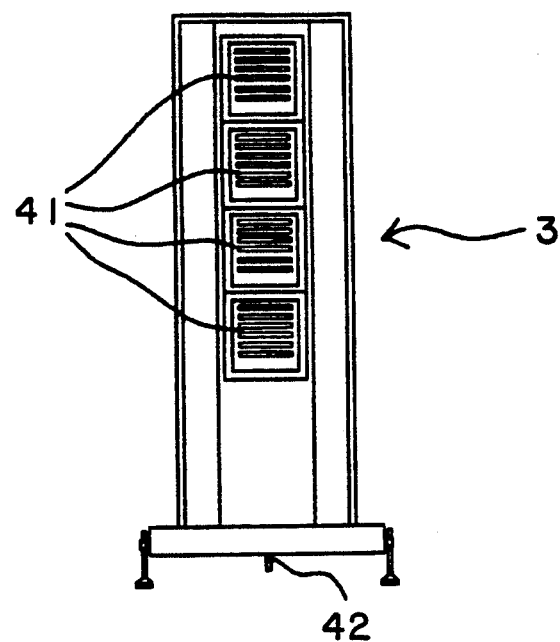
FIG. 4 is a front view showing an example of the aspirator.

FIG. 4 is a front view showing an example of the aspirator 3 disposed in a position facing expirator 2. As shown, the front side of the aspirator 3 is provided with a plurality of aspirating orifices 41 from which the fog 6 and the air of air curtains 5,5' are aspirated. This aspirator 3 not only serves to prevent increase of humidity due to the expired fog 6 but also controls the flow of the fog 6 and of the air curtains 5,5'. Disposed within the aspirator 3 are a plurality of carrier means (for example, wire-mesh screens) so that the fog 6 aspirated through the orifices 41 and brought into contact with the carriers means is converted to water which, in turn, can be discarded from a drain 42.

The projector 4 is not limited in kind but any of the usual projectors can be successfully employed.

For the projection of an image using the above system, the expirator 2 and the aspirator 3 are disposed at a suitable distance from each other and air is blown from the air outlets 7,7' of the expirator 2 to form air curtains 5,5', while a fog 6 is exhaled from the fog outlet 8 into the space between said air curtains 5,5' to form a fog screen 1. Since the diffusion of the fog 6 is restricted by the air curtains 5,5', the fog screen 1 is uniform and high in density. As an optical image is projected from the projector 4 on this fog screen 1, imagewise light is reflected by the fog 6 so that the spectators or audience can view the reflected image.

The projection of an optical image from the projector 4 on the fog screen 1 can be effected from either the audience side or the other side, but in the former case the amount of transmitted light is relatively large and the reflected light is relatively small so that the definition of the image is sacrificed. Therefore, projection from the side of the fog screen which is opposite to the audience is preferred.

The present invention is not limited to the above specific embodiment but many changes and modifications may be made within the purview of those skilled in art. For example, whereas the direction of expiration of the air curtains 5,5' and fog 1 is horizontal in the above embodiment, it may be vertical, if desired. Moreover, it may be so arranged that the air for said air curtains is blown in a horizontal direction while the fog is blown in a vertical direction. The reverse arrangement may also be adopted. Furthermore, when the fog screen is used outdoors where humidity need not be a consideration, the aspirator may be omitted.

In the present invention, the diffusion of the fog is precluded by the air curtains to insure a well-defined image even in positions remote from the fog outlet. Moreover, as the fog is secluded from the ambient atmosphere by the air curtains, the distortion and interruption of the image due to accidental air currents is prevented. Therefore, the invention provides a fog screen which insures a sharp image reproduction and enables the audience to walk through it freely, thus contributing to dramatic effects.

What is claimed is:

1. Apparatus for forming a fog screen for the display thereon of an optical image projected from a projector comprising an expirator device having a base, means for holding a supply of water in said base, a pair of spaced, vertically extending air nozzles mounted on said base, fan means for supplying air under pressure to said air nozzles to form a pair of spaced, parallel and horizontally extending curtains of air, a vertically extending fog outlet mounted on said base between said air nozzles, fog generating nozzle means for generating fog from said water supply means in said base and expelling it through said fog outlet to form a horizontally extending fog screen in the space between said air curtains and an aspirator device spaced horizontally from said expirator device having a plurality of vertically extending aspirating orifices for receiving spent fog from the fog screen, said aspirator device including carrier means for converting the fog aspirated through said orifices into water.

2. The apparatus of claim 1 wherein said air curtains are spaced apart a distance of from 30 to 100 mm.

3. The apparatus of claim 2 wherein said fog screen has a mean water particle diameter in the range of from 10 to 30 microns.

4. The apparatus of claim 2 wherein said fog screen has a mean water particle diameter less than 10 microns.

* * * * *